US012095874B2

(12) United States Patent
Srinivasan et al.

(10) Patent No.: US 12,095,874 B2
(45) Date of Patent: Sep. 17, 2024

(54) SENSITIVE DATA CLASSIFICATION FOR MICRO-SERVICE APPLICATIONS

(71) Applicant: Acante, Inc., Saratoga, CA (US)

(72) Inventors: Udayakumar Srinivasan, Fremont, CA (US); Dhruv Hemchand Jain, Santa Clara, CA (US); Sarangan Rangachari, Saratoga, CA (US); Advait Abhay Dixit, Sunnyvale, CA (US); Abhishek Das, San Francisco, CA (US)

(73) Assignee: Acante, Inc., Saratoga, CA (US)

( * ) Notice: Subject to any disclaimer, the term of this patent is extended or adjusted under 35 U.S.C. 154(b) by 199 days.

(21) Appl. No.: 17/898,092

(22) Filed: Aug. 29, 2022

(65) Prior Publication Data

US 2024/0073290 A1    Feb. 29, 2024

(51) Int. Cl.
| H04L 67/51 | (2022.01) |
| H04L 9/32 | (2006.01) |
| H04L 67/02 | (2022.01) |
| H04L 67/133 | (2022.01) |

(52) U.S. Cl.
CPC ............ *H04L 67/51* (2022.05); *H04L 9/3213* (2013.01); *H04L 9/3247* (2013.01); *H04L 67/02* (2013.01); *H04L 67/133* (2022.05)

(58) Field of Classification Search
None
See application file for complete search history.

(56) References Cited

U.S. PATENT DOCUMENTS

| 7,526,550 B2 | 4/2009 | Frey et al. |
| 9,697,104 B2 | 7/2017 | Obermiller et al. |
| 10,114,559 B2 | 10/2018 | Erdmann et al. |
| 2019/0273746 A1* | 9/2019 | Coffing ................. G06Q 20/40 |

(Continued)

FOREIGN PATENT DOCUMENTS

CN    110149397 A    8/2019

OTHER PUBLICATIONS

Averdunk, Ingo, "Implement distributed tracing in your microservices-based app," www.ibm.com/garage/method/practices/code/distributed-tracing, May 8, 2022, 3 pages.

(Continued)

*Primary Examiner* — Schquita D Goodwin
*Assistant Examiner* — Jonathan A Sparks
(74) *Attorney, Agent, or Firm* — Dority & Manning, P.A.

(57) ABSTRACT

A validating service of a plurality of services that compose an application receives a security token that identifies an entity that has submitted a transaction to the application, the security token indicating that the entity is authorized to submit the transaction to the application. The validating service obtains a transaction identifier that uniquely identifies the transaction. The validating service sends, to a collector service, the transaction identifier and data derived from the security token that identifies the entity. A downstream service receives input data associated with the transaction, the input data including the transaction identifier. The downstream service accesses an information source to obtain information. The downstream service sends, to the collector service, the transaction identifier and metadata about the information.

21 Claims, 9 Drawing Sheets

(56) References Cited

U.S. PATENT DOCUMENTS

| | | | |
|---|---|---|---|
| 2023/0092902 A1* | 3/2023 | Jiang | G06Q 20/4016 705/64 |
| 2023/0169500 A1* | 6/2023 | Hulick, Jr | G06Q 20/401 705/44 |
| 2023/0171240 A1* | 6/2023 | Hulick, Jr. | H04L 9/3263 726/6 |
| 2023/0179417 A1* | 6/2023 | James | H04L 63/10 713/168 |

OTHER PUBLICATIONS

Barabanov, et al., "Security Audit Logging in Microservice-Based Systems: Survey of Architecture Patterns," arXiv:2102.09435, Feb. 2021, 12 pages.

Cinque et al., "Microservices Monitoring with Event Logs and Black Box Execution Tracing," IIEEE Transactions on Services Computing, vol. 15, No. 1, doi: 10.1109/TSC.2019.2940009, Jan. 2022, pp. 294-307.

Newman, Andre, "Why Transaction Tracing is Critical for Monitoring Microservices," www.loggly.com/blog/why-transaction-tracing-is-critical-for-monitoring-microservices, Jan. 20, 2020, 5 pages.

\* cited by examiner

```
22
   [Header].{
76 { "aud": "416684a7-0b52-4fa3-9918-e76d16542be2",
   "iss": "https://login.microsoftonline.com/c72ad-d7aS/v2.0",
   "iat": 1563883336,
   "nbf": 1563883336,
   "exp": 1563887236,
   "aio": "ATQAy/8MAAAAaItA/3Modx+ON+QMi5O2ot5rFp5j",
   "azp": "bb764c21-49b8-49de-aa24-6c76d7dc800f",
   "azpacr": "0"
78 { "name": "Bob Jones",
   "oid": "0e748cd0-5d2a-4918-a351-9549e75fd1dd",
80 { "preferred_username": "BobJ@microsoftidentity.dev", "rh": "I",
   "roles":["Admin"],
   "scp": "Catalog.View.All Catalog.View.Published",
   "sub": "0X7PvET4orHRnrRYnd MvA4CY!Yxg_CowsE1BGT1AK6hE",
   "tid": "c72a295d-d7a5-41ea-a351-b15dd9f67215",
   "uti": "kaeFCRGwm0SOwMNnjvlHAA",
   "ver": "2.0"
81 { }.[Signature]
```

SENSITIVE DATA CLASSIFICATION FOR MICRO-SERVICE APPLICATIONS

BACKGROUND

The trend to develop applications as a collection of interrelated services offers many advantages, including increased scalability, easier maintenance, reuse of services in disparate applications, and the like.

SUMMARY

The embodiments disclosed herein implement sensitive data classification for micro-service applications.

In one embodiment a method is provided. The method includes receiving, by a validating service of a plurality of services that compose an application that executes on one or more processor devices, a security token that identifies an entity that has submitted a transaction to the application, the security token indicating that the entity is authorized to submit the transaction to the application. The method further includes obtaining, by the validating service, a transaction identifier that uniquely identifies the transaction. The method further includes causing, by the validating service, the transaction identifier and data derived from the security token that identifies the entity to be sent to a collector service. The method further includes receiving, by a downstream service, input data associated with the transaction, the input data including the transaction identifier. The method further includes accessing, by the downstream service, an information source to obtain information. The method further includes causing, by the downstream service, the transaction identifier and metadata about the information to be sent to the collector service.

In another embodiment a computing system is provided. The computing system includes one or more processor devices of one or more computing devices. The one or more processor devices are configured to receive, by a validating service of a plurality of services that compose an application, a security token that identifies an entity that has submitted a transaction to the application, the security token indicating that the entity is authorized to submit the transaction to the application. The one or more processor devices are further configured to obtain, by the validating service, a transaction identifier that uniquely identifies the transaction. The one or more processor devices are further configured to cause, by the validating service, the transaction identifier and data derived from the security token that identifies the entity to be sent to a collector service. The one or more processor devices are further configured to receive, by a downstream service, input data associated with the transaction, the input data including the transaction identifier. The one or more processor devices are further configured to access, by the downstream service, an information source to obtain information. The one or more processor devices are further configured to cause, by the downstream service, the transaction identifier and metadata about the information to be sent to the collector service.

In another embodiment a non-transitory computer-readable storage medium is provided. The non-transitory computer-readable storage medium includes executable instructions configured to cause one or more processor devices to receive, by a validating service of a plurality of services that compose an application, a security token that identifies an entity that has submitted a transaction to the application, the security token indicating that the entity is authorized to submit the transaction to the application. The instructions are further configured to cause the one or more processor devices to obtain, by the validating service, a transaction identifier that uniquely identifies the transaction. The instructions are further configured to cause the one or more processor devices to cause, by the validating service, the transaction identifier and data derived from the security token that identifies the entity to be sent to a collector service. The instructions are further configured to cause the one or more processor devices to receive, by a downstream service, input data associated with the transaction, the input data including the transaction identifier. The instructions are further configured to cause the one or more processor devices to access, by the downstream service, an information source to obtain information. The instructions are further configured to cause the one or more processor devices to cause, by the downstream service, the transaction identifier and metadata about the information to be sent to the collector service.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Software applications are increasingly implemented as a collection of individual services. Thus, rather than execute on a computing device as a single process as may have occurred in the past, today a software application is likely to be implemented via a plurality of individual services that may even run on different computing hosts. Each service may execute as a separate process or group of processes. The services typically communicate with one another through a messaging infrastructure, such as queues, a service mesh, a RESTful Application Programming Interface (API), or the like. This may sometimes be referred to as a micro-service architecture.

There are many advantages to a micro-service architecture approach to application development, such as ease of maintenance, ability to use certain services in different applications with little or no modifications, an ability to spread services across different computing devices for load balancing purposes, and the ability to scale at a service level. A micro-service architecture may be implemented via any number of different technologies including, by way of non-limiting example, cloud-native technologies such as containers and serverless functions.

As security has become increasingly important, it is now common for an application to require electronic credentials, such as a security token, that identifies and authorizes a transaction originator of a transaction prior to processing the transaction. Such tokens may be obtained by an originator from an identity provider, such as Microsoft, Okta, or the like who validates an originator's identity and generates a security token that is signed by the identity provider. The entry point into the application, such as a validating service, may receive the security token, ensure that the signature of the identity provider is correct, and then begin processing the transaction in accordance with the privileges identified in the security token.

It is common that, once the transaction has been accepted, the security token is not passed along from service to service because there is typically no reason to do so since it has been determined that the transaction has been authorized to be processed by the application.

Each service in the application may invoke (e.g., access) other information sources such as, by way of non-limiting example, another internal service or external service, a datastore, a data files, or the like. The term "datastore" refers to any structure that operates to store data, including, by way of non-limiting example, a database. Services may send sensitive data to, and/or receive sensitive data from, such information sources. Such sensitive data may include, by way of non-limiting example, names, addresses, credit card numbers, drivers licenses, social security numbers, and the like. Unfortunately, even if it is determined that such sensitive data has been received or sent by a service, it can be difficult or impossible to correlate the sensitive data with a particular transaction, or with an originator of the transaction.

The embodiments disclosed herein implement sensitive data classification for micro-service applications. In particular, in some embodiments, a validating service of a plurality of services that compose an application receives a security token that identifies an entity that has submitted a transaction to the application. The validating service obtains a transaction identifier that uniquely identifies the transaction, and sends a message to a collector service that includes the transaction identifier and information derived from the security token to a collector service to correlate the transaction identifier to the data that identifies the entity. A downstream service receives input data associated with the transaction, the input data including the transaction identifier. The downstream service accesses an information source to obtain information and sends, to the collector service, a message that includes the transaction identifier the metadata about the information. The transaction identifier is passed from service to service as the transaction propagates through the application, and the process may be repeated at each service that obtains information from an information source.

The collector service receives the messages from the services and stores records based on the transaction identifier and the metadata about the information. Over a period of time, the collector service may receive thousands, hundreds of thousands, or millions of such messages and store thousands, hundreds of thousands, or millions of records.

A sensitive data visualizer may access the records and identify transactions that involved sensitive data, the service or services that sent or received sensitive data, and the originators of such transactions.

Figure 1A:
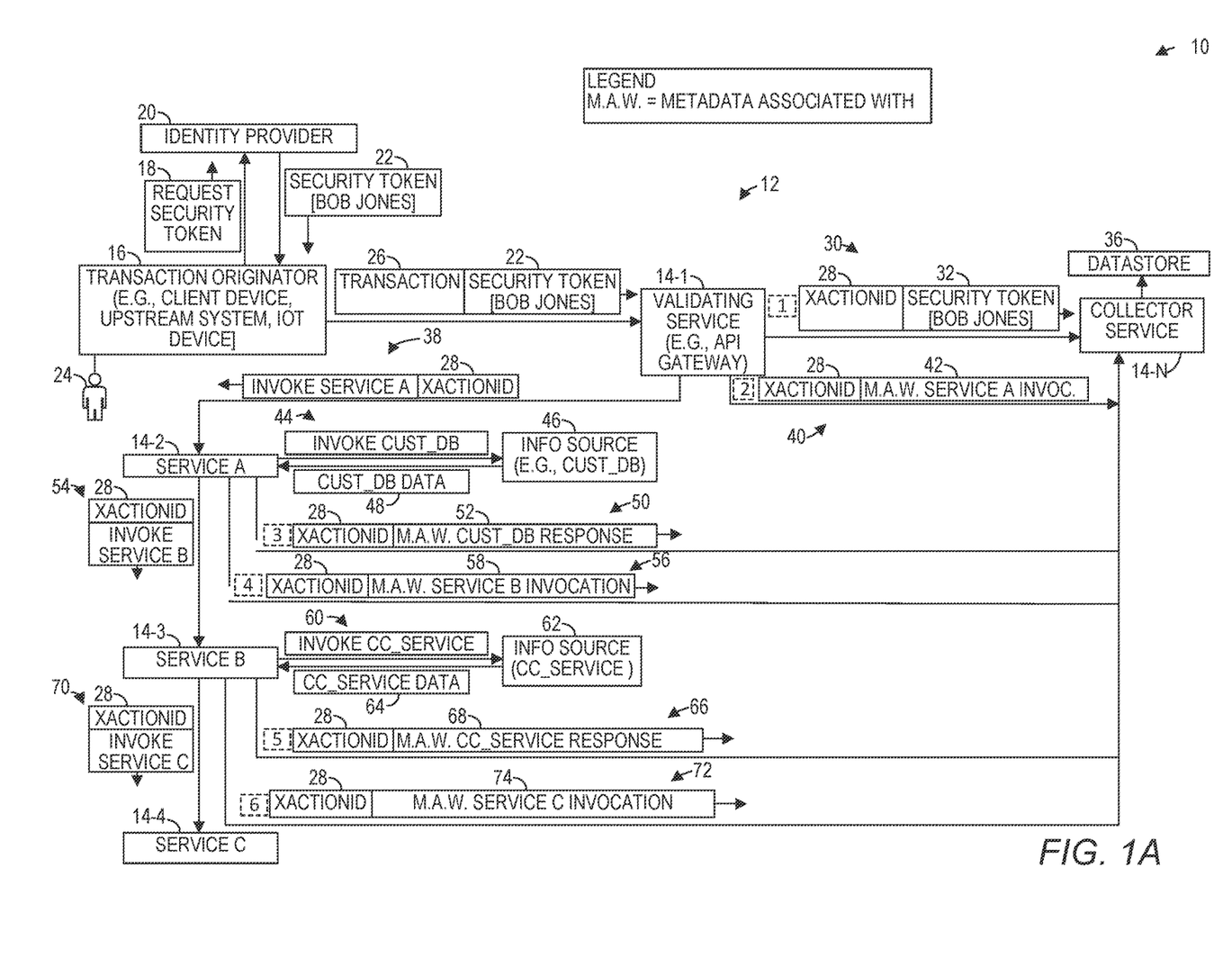
FIGS. 1A-1B are block diagrams of an environment suitable for implementing sensitive data classification for micro-service applications according to one embodiment.
Figure 1B:
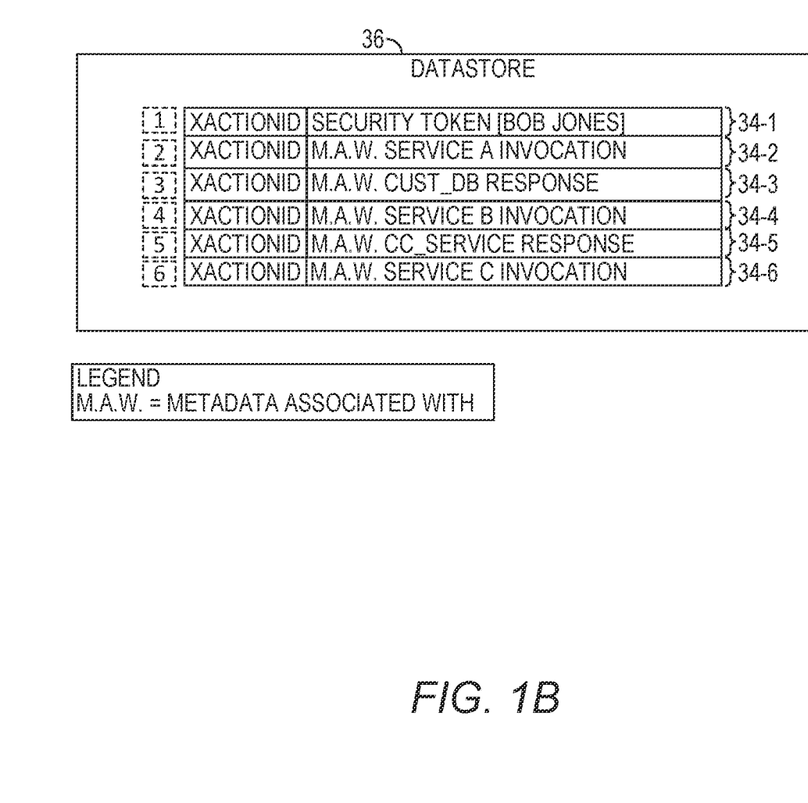

FIGS. 1A-1B are block diagrams of an environment 10 suitable for implementing sensitive data classification for micro-service applications according to one embodiment. The environment 10 includes an application 12 that is composed of a plurality of micro-services 14-1-14-N (herein generally, services 14). The term "micro" in the phrase "micro-service" refers to the fact that the application comprises multiple different services, and does not imply a particular programming language or application architecture. Collectively, the services 14 compose the application 12. In some implementations, the application 12 comprises a cloud-native application, and the services 14 may comprise, for example, serverless functions, or containers. In some embodiments, the services 14 may run in a container orchestration system, such as Kubernetes, and may comprise pods. While not illustrated due to space limitations, each of the services 14 execute on computing devices that include memory and one or more processor devices. The services 14 may execute on the same computing device, or may execute on multiple computing devices. In a cloud computing environment, the services 14 may be distributed over any number of computing devices.

The services 14 communicate with one another using any desired inter-process communication (IPC) mechanism, such as, by way of non-limiting examples, one or more of message queues, files, a RESTful API, service mesh IPC mechanisms, and the like. Although in the embodiments discussed herein the application 12 provides an online website functionality, the embodiments are not limited to any particular application functionality and have applicability to any application comprising a micro-service architecture.

The application 12 includes one or more validating services 14-1 which receive transactions from entities. The validating service 14-1, in this example, is a gateway API entrypoint service into the application 12, but in other implementations, the validating service 14-1 may not be a gateway API service. Moreover, while for purposes of convenience the validating service 14-1 is illustrated as a single service 14, in other implementations, multiple services 14 may operate to provide the functionality attributed herein to the validating service 14-1. The application 12 may be configured to deny any transaction that is not first provided to the validating service 14. The validating service 14-1, prior to allowing the application 12 to process a transaction, validates that the entity submitting the transaction has the authority to do so.

In this example, a transaction originator 16 initially sends a request 18 to an identity provider 20 for a security token 22. The transaction originator 16 may, by way of non-limiting example, be a client device that sends the request 18 in response to input from a user 24. Alternatively, the application 12 may be an application that is downstream of some upstream application, and the transaction originator 16 may be a service of another application. In another implementation, the transaction originator 16 may be a standalone device, such as an Internet-of-Things (IoT) device, or the like.

The identity provider 20 is operated by a trusted entity such as Microsoft, Okta, or the like that validates (or does not validate) a transaction originator's request for a security token. The validation may depend on whatever criteria the identity provider 20 requires, such as valid authentication credentials, or the like. In this example, assume that the request 18 contains appropriate authentication information, such as a user identifier and password of the user 24, and the identity provider 20 determines that the transaction originator 16 is authorized to access the application 12. The identity provider 20 generates a message (referred to herein as the security token 22), that indicates that the transaction originator 16 is authorized to access the application 12 and sends the security token 22 to the transaction originator 16. The security token 22 contains information associated with the transaction originator 16, such as an identity of an individual, such as the user 24, associated with the request 18. The security token 22 may also include permitted actions with respect to the application 12. The identity provider 20 may also digitally sign the security token 22 with a digital signature of the identity provider 20.

The transaction originator 16 receives the security token 22 and sends a transaction 26 and the security token 22 to the validating service 14-1. The validating service 14-1 receives the transaction 26 and the security token 22 indicating that the entity, in this example, the user 24, is authorized to submit the transaction 26 to the application 12. The validating service 14-1 may validate the digital signature of the security token 22.

The validating service 14-1 obtains a transaction identifier (ID) 28 that uniquely identifies the transaction. In some embodiments, the transaction originator 16 may provide the transaction ID 28. In some embodiments, a module between the transaction originator 16 and the validating service 14-1 may generate the transaction ID 28, and the transaction ID 28 may accompany the transaction 26. In other embodiments, the validating service 14-1 may generate the transaction ID 28. In other embodiments, the validating service 14-1 may invoke a transaction identifier generation service to obtain the transaction ID 28.

The validating service 14-1 causes a message 30 that includes the transaction ID 28 and data 32 derived from the security token 22 to be sent to a collector service 14-N. The data 32 may include any desired information contained in the security token 22, including, by way of non-limiting example, information that identifies the entity that caused the transaction 26 to be submitted to the application 12. For example, in this example, the information includes the name of the user 24. The data 32 may also identify certain access rights that the user 24 may have, and/or certain access rights that the user 24 does not have. Examples of a security token are discussed below, and any such information may be included in the data 32.

The collector service 14-N receives the transaction ID 28 and the data 32, generates a record 34-1, and stores the record 34-1 in a datastore 36, as illustrated in FIG. 1B. The record 34-1 correlates the transaction ID 28 with the user 24. The collector service 14-N, or another service 14, may determine that additional information may be necessary and/or desired than is provided in the security token 22. The collector service 14-N may then use information in the security token 22 to interface with an Identity and Access Management (IAM) provider to obtain additional information about the transaction originator 16. Such additional information may include, by way of non-limiting example, a client application identifier, a user identifier, a group identifier, roles, privileges granted for the specific transaction, an IP address, a geolocation of the transaction originator 16, and what policies enabled the initiation of the transaction 26. The collector service 14-N stores such information in conjunction with the transaction ID 28.

The validating service 14-1 may now begin to process the transaction 26. In this example, the services 14 comprise services that utilize a RESTful API (sometimes referred to as a REST API) to communicate with one another. The validating service 14-1 invokes 38 a particular API entrypoint of the service 14-2 using a hypertext transfer protocol (HTTP) GET request and provides, in conjunction with the invocation, the transaction ID 28. The transaction ID 28 may be provided as a parameter in the HTTP GET request, or in a header of the HTTP GET request, or via any other suitable manner in conjunction with the HTTP GET request. The term "invoke" as used herein refers to any mechanism for accessing, transferring control, or otherwise communicating between a first entity, such as a service, and a second entity. The term "invoke" may also be referred to as a request. By way of non-limiting example, invoking can refer to the invocation of a method of the second entity, such as a Java method, can refer to a message passed to a datastore entity, can refer to the reading of a file, can refer to the invocation of an API entrypoint, or can refer to the insertion of a message into a message queue.

One or more, or each of the services 14, may cause the transaction ID 28 and metadata about an invocation to be sent to the collector service 14-N upon the occurrence of certain events, such as, by way of non-limiting example, when an information source, such as the respective service 14, is invoked, and when the respective service 14 invokes another information source. One or more, or each, of the services 14 may also cause metadata about information contained in a response and the transaction ID 28 to be sent to the collector service 14-N upon receiving a response from an invoked information source. The term "information source" in this context refers to any entity via which a service 14 may obtain a response that includes information, such as another service 14, a datastore, a file, or the like. The term "cause" refers to a service 14 directly sending metadata and the transaction ID 28 to the collector service 14-N, or indirectly sending the metadata and the transaction ID 28 to the collector service 14-N. For example, the service 14 may send information regarding an invocation or a response, and the transaction ID 28, to an intermediary service 14 that first processes the information to generate the metadata and then sends the metadata and the transaction ID 28 to the collector service 14-N.

The metadata may include sensitive data classification types, such as sensitive data categorizations, and sensitive data sub-categorization types. The sensitive data categorization may indicate that a response received by a service 14, or data used in an invocation of a service 14, included sensitive data, such as Personally Identifiable Information (PII). Sensitive data sub-categorization types may include types of PII, such as a name, an address, a credit card number, a driver's license, a social security number, and the like.

Prior to or subsequent to the validating service 14-1 invoking the particular API entrypoint of the service 14-2, the service 14-1 may generate a message 40 that includes the transaction ID 28 and metadata 42 associated with (M.A.W.) the invocation of the service 14-2, such as the actual API entry point of the service 14-2 invoked by the validating service 14-1, and metadata about the data provided in the HTTP GET request. The metadata about the data provided in the HTTP GET request may comprise, for example, metadata that indicates whether the data provided in the HTTP GET request contained sensitive data, and if so, the metadata may comprise sensitive data sub-categorization types of the data provided in the HTTP GET request. The validating service 14-1 sends the message 40 to the collector service 14-N. The collector service 14-N receives the message 40, generates a record 34-2, and stores the record 34-2 in the datastore 36, as illustrated in FIG. 1B.

An invoked service 14 may be referred to as a downstream service 14 with respect to the invoking service 14. The invoked service 14-2 receives input data associated with the transaction that is provided by the invoking service 14-1 in the HTTP GET request. The input data includes the transaction ID 28. Although not illustrated due to spatial limitations, the service 14-2 may cause to be sent to the collector service 14-N the transaction ID 28 and metadata associated with the invocation of the service 14-2, including, by way of non-limiting example, metadata about the data provided in the HTTP GET request, such as whether the data provided in the HTTP GET request contained sensitive data, and if so, sensitive data sub-categorization types of the data provided in the HTTP GET request.

In this example, the service 14-2 invokes 44 an information source 46 that comprises a datastore. Although not illustrated due to spatial limitations, the service 14-2 may cause the transaction ID 28 and metadata associated with the invocation of the information source 46, such as, by way of non-limiting example, the datastore action contained in the invocation, such as a query or store, metadata about the data provided in the invocation, the name of the datastore that was accessed, the names of the datastore table or tables that were accessed, the column names (i.e., data field names) of the columns returned in information 48, such as whether the data provided in the invocation contained sensitive data, and if so, sensitive data sub-categorization types of the data provided in the invocation to be sent to the collector service 14-N which generates a record and stores the record in the message datastore 36.

The service 14-2 receives the information 48 from the information source 46. In this example, the service 14-2 generates a message 50 that includes the transaction ID 28 and metadata 52 associated with the response from the information source 46, such as, by way of non-limiting example, the name of the datastore that was accessed, the names of the datastore table or tables that were accessed, the column names (i.e., data field names) of the columns returned in the information 48, and whether any of the information 48 contained sensitive data, and if so, sensitive data sub-categorization types of the data. The service 14-2 sends the message 50 to the collector service 14-N. The collector service 14-N receives the message 50, generates a record 34-3, and stores the record 34-3 in the datastore 36, as illustrated in FIG. 1B.

The service 14-2 invokes 54 a particular API entrypoint of the service 14-3 using an HTTP GET request and provides, in conjunction with the invocation, the transaction ID 28. Prior to or subsequent to the service 14-2 invoking the particular entrypoint of the service 14-3, the service 14-2 may generate a message 56 that includes the transaction ID 28 and metadata 58 associated with the invocation of the service 14-3, such as the actual API entry point of the service 14-3 invoked by the service 14-2, and metadata about the data provided in the HTTP GET request, such as whether the data provided in the HTTP GET request contained sensitive data, and if so, sensitive data sub-categorization types of the data provided in the HTTP GET request. The service 14-2 sends the message 56 to the collector service 14-N. The collector service 14-N receives the message 56, generates a record 34-4, and stores the record 34-4 in the datastore 36, as illustrated in FIG. 1B.

Although not illustrated due to spatial limitations, the service 14-3 may generate and send to the collector service 14-N a message that includes the transaction ID 28 and metadata associated with the invocation of the service 14-3, including, by way of non-limiting example, metadata about the data provided in the HTTP GET request, such as whether the data provided in the HTTP GET request contained sensitive data, and if so, sensitive data sub-categorization types of the data provided in the HTTP GET request.

In this example, the service 14-3 invokes 60 an information source 62 that comprises a credit card service. Although not illustrated due to spatial limitations, the service 14-3 may generate a message that includes the transaction ID 28 and metadata associated with the invocation of the information source 62, such as, by way of non-limiting example, the data provided in the invocation of the information source 62, metadata about the data provided in the invocation, such as whether the data provided in the invocation contained sensitive data, and if so, sensitive data sub-categorization types of the data provided in the invocation. The service 14-3 may then cause the message to be sent to the collector service 14-N which generates a record and stores the record in the message datastore 36.

The service 14-3 receives a response 64 from the information source 62. The service 14-3 generates a message 66 that includes the transaction ID 28 and metadata 68 associated with the response 64 from the information source 62, such as, by way of non-limiting example, data received from the information source 62, and whether any of the response 64 contained sensitive data, and if so, sensitive data sub-categorization types of the data. The service 14-3 sends the message 66 to the collector service 14-N. The collector service 14-N receives the message 66, generates a record 34-5, and stores the record 34-5 in the datastore 36, as illustrated in FIG. 1B.

The service 14-3 then invokes 70 a particular API entry-point of the service 14-4 using an HTTP GET request and provides, in conjunction with the invocation, the transaction ID 28. Prior to or subsequent to the service 14-3 invoking the particular entrypoint of the service 14-4, the service 14-3 may generate a message 72 that includes the transaction ID 28 and metadata 74 associated with the invocation of the service 14-4, such as the actual API entry point of the service 14-4 invoked by the service 14-3, and metadata about the data provided in the HTTP GET request, such as whether the data provided in the HTTP GET request contained sensitive data, and if so, sensitive data sub-categorization types of the data provided in the HTTP GET request. The service 14-3 sends the message 72 to the collector service 14-N. The collector service 14-N receives the message 72, generates a record 34-6, and stores the record 34-6 in the datastore 36, as illustrated in FIG. 1B.

This process repeats with each information source accessed during the processing of the transaction 26. Each service 14 passes the transaction ID 28 to a downstream service 14. Each invocation of an information source, such as a service 14, a datastore, a file, or the like, may result in the generation and storage of a record in the datastore 36 that identifies the transaction ID 28, whether the invocation involved sensitive data, and if so, categorizations of the sensitive data.

Although not illustrated due to spatial constraints, the embodiments disclosed herein may also generate a message for each response to an invocation and send the message to the collector service 14-N. For example, when an invoked service 14 returns a response to an invoking service 14, the invoking service 14 may generate a message that includes the transaction ID, metadata about the data in the response, such as whether the data provided in the response contained sensitive data, and if so, sensitive data sub-categorization types of the data provided in the response, and send the message to the collector service 14-N. The collector service 14-N receives the message, generates a record 34, and stores the record 34 in the datastore 36. Thus, records 34 may be generated and stored for each "request" (i.e., invocation) and each response to a request.

As will be discussed below, a sensitive data visualizer may access the datastore 36 and query the datastore 36 to identify transactions that involved sensitive data, identify the particular services 14 and other information sources that involved sensitive data, identify the entities responsible for the transactions, identify sensitive data sub-categorization types, and the like.

Figure 2:
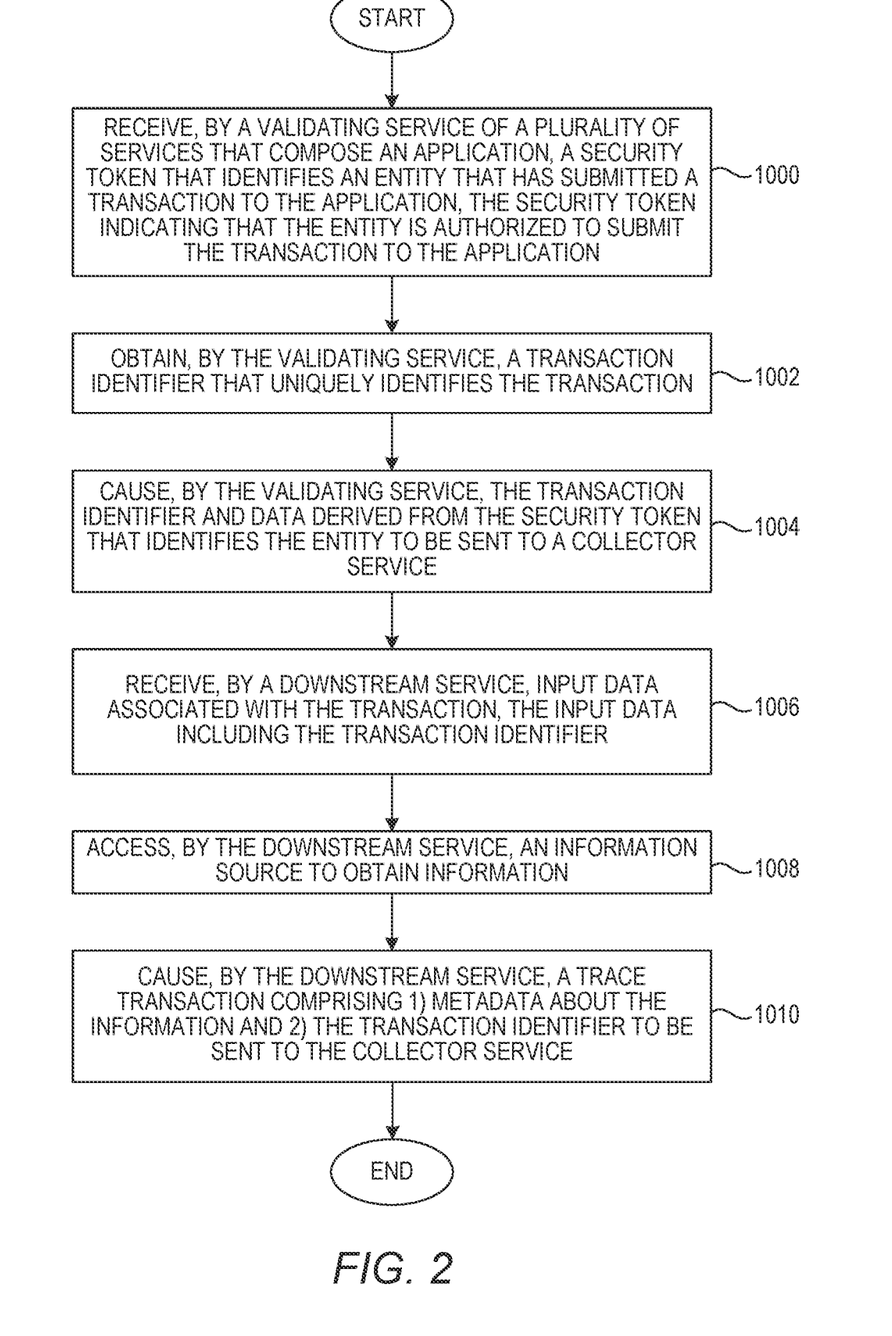
FIG. 2 is a flowchart of a method for sensitive data classification for micro-service applications according to one embodiment.

FIG. 2 is a flowchart of a method for sensitive data classification for micro-service applications according to one embodiment. FIG. 2 will be discussed in conjunction with FIGS. 1A-1B. The validating service 14-1 receives the security token 22 that identifies the entity 24 that has submitted the transaction 26 to the application 12, the security token 22 indicating that the entity 24 is authorized to submit the transaction 26 to the application 12 (FIG. 2, block 1000). The validating service 14-1 obtains the transaction ID 28 that uniquely identifies the transaction 26 (FIG. 2, block 1002). The validating service 14-1 causes the transaction ID 28 and the data 32 derived from the security token 22 that identifies the entity 24 to be sent to the collector service 14-N (FIG. 2, block 1004). The downstream service 14-2 receives input data associated with the transaction 26, the input data including the transaction ID 28 (FIG. 2, block 1006). The downstream service 14-2 accesses the information source 46 to obtain the information 48 (FIG. 2, block 1008). The downstream service 14-2 causes the message 50 comprising 1) metadata about the information 48 and 2) the transaction ID 28 to be sent to the collector service 14-N (FIG. 2, block 1010).

Figure 3:
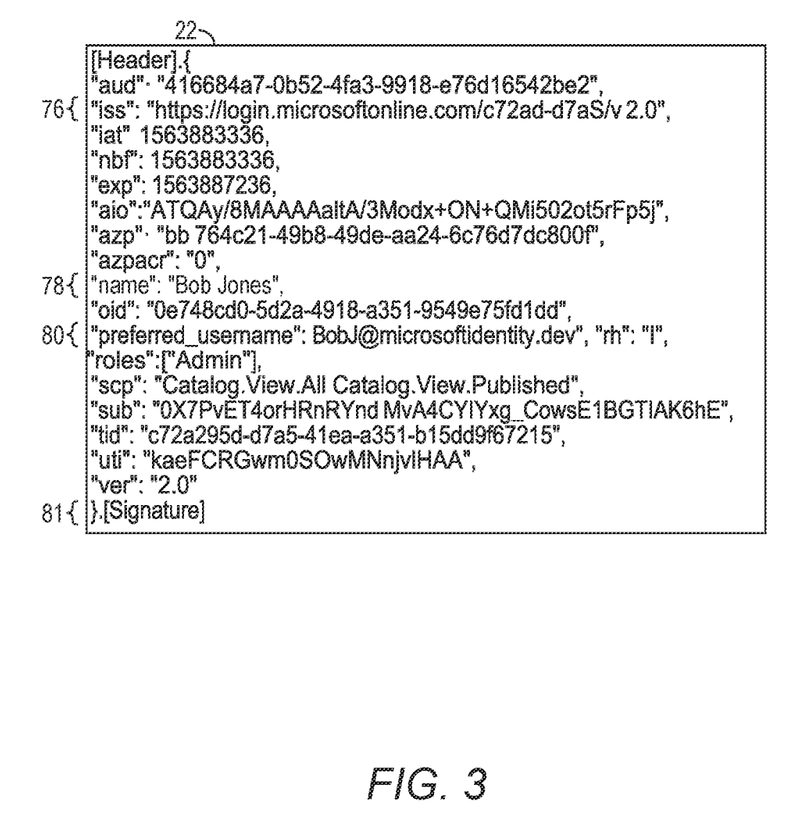
FIG. 3 illustrates a security token according to one embodiment.

FIG. 3 illustrates the security token 22 according to one embodiment. The security token 22 may contain an issuer claim 76 that identifies the principal that issued the security token, in this example, the identity provider 20. The security token 22 may also contain a name key-value pair 78 that identifies the entity associated with the transaction, in this example, the user 24. The security token 22 may also contain a preferred name key-value pair 80 that identifies an email address associated with the entity associated with the transaction. The security token 22 may also contain a digital signature 81 of the identity provider 20. The validating service 14-1 may extract any of the information contained in the security token 22, including the entire contents of the security token 22, and send the information to the collector service 14-N to correlate the transaction ID 28 with the security token 22, and thus to the user 24.

Figure 4:
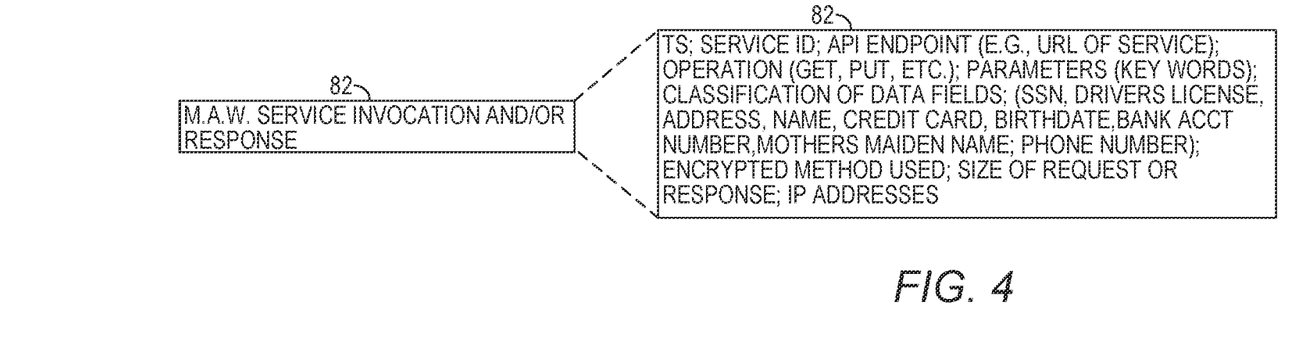
FIG. 4 illustrates example metadata that may be generated and provided to a collector service by an invoking service or an invoked service as metadata associated with the invocation of a service or metadata associated with a response of an invoked service according to one implementation.

FIG. 4 illustrates example metadata 82 that may be generated and provided to the collector service 14-N by an invoking service 14 or an invoked service 14 as metadata associated with the invocation of a service 14, or metadata associated with a response from an invoked service 14. By way of non-limiting example, the metadata 82 may include a timestamp (TS) of the invocation or response; an indication that the data is associated with a request or a response; the size of the request or response; an identifier of the service 14 that was invoked; an identifier of the invoking service 14; the API endpoint that was invoked (e.g., the URL that was invoked); the RESTful HTTP operation (e.g., GET, PUT); parameters and/or data items included in the invocation or response; sensitive data sub-categorization types of data contained in the invocation or response such as a social security number, a driver's license identifier, an address, a name, a credit card number, a birth date, a bank account number, a mother's maiden name, a phone number; and an indication as to whether an encrypted path was used for the invocation. If desired, the metadata 82 may include the sensitive data sub-categorization types and the actual sensitive data contained in the invocation or response. Alternatively, for privacy considerations, the metadata 82 may contain only the sensitive data sub-categorization types of the data contained in the invocation or response and omit the sensitive data. In some embodiments, the metadata 82 may contain the sensitive data sub-categorization types of the data and all non-sensitive data, but omit sensitive data.

Figure 5:
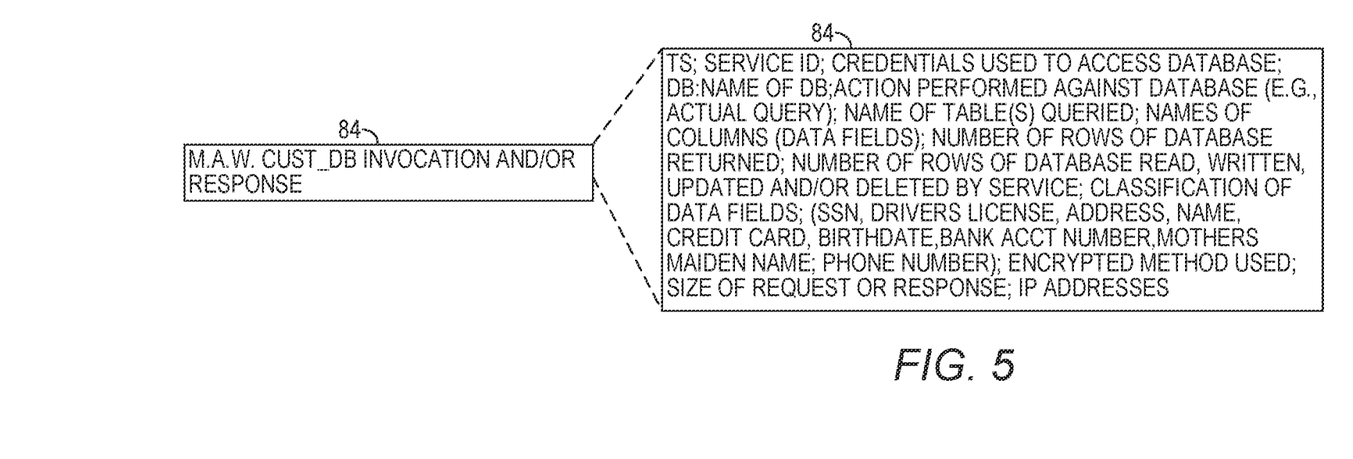
FIG. 5 illustrates example metadata that may be generated and provided to a collector service as metadata associated with the invocation of a datastore information source or metadata associated with a response of an invoked datastore information source according to one implementation.

FIG. 5 illustrates example metadata 84 that may be generated and provided to the collector service 14-N as metadata associated with the invocation of a datastore information source or metadata associated with a response from an invoked datastore information source. By way of non-limiting example, the metadata 84 may include a timestamp (TS) of the invocation or response; an indication that the data is associated with a request or a response; an identifier of the service 14 that invoked the datastore; the credentials used to access the datastore (e.g., user identifier and password); a name of the datastore that was accessed; the specific action that was performed against datastore (e.g., the actual SQL command, such as a query, read, delete or modify that was issued to the datastore (e.g., QUERY=SELECT FNAME, ADDRESS FROM USER_DATA WHERE CUST_ID=####); the names of the datastore tables that were accessed; the names of the columns (e.g., data items) that were accessed; the number of rows of the datastore that were returned; the number of returned rows of the datastore that were actually read by the service 14; sensitive data sub-categorization types of data contained in the data requested and/or received from the datastore, such as a social security number, a driver's license identifier, an address, a name, a credit card number, a birth date, a bank account number, a mother's maiden name, a phone number; and an indication as to whether an encrypted path was used for the invocation. If desired, the metadata 84 may include the sensitive data sub-categorization types and the actual sensitive data received. Alternatively, for privacy considerations, the metadata 84 may contain only the sensitive data sub-categorization types of the data received from the datastore and omit the sensitive data. In some embodiments, the metadata 84 may contain the sensitive data sub-categorization types of the data and all non-sensitive data, but omit sensitive data.

As the collector service 14-N receives the metadata associated with service invocations, datastore invocations, corresponding responses and the like, the collector service 14-N may store such data in the datastore 36 such that the data is indexed and searchable by any desired fields, and correlated with the transaction ID 28 and the user 24.

Figure 6:
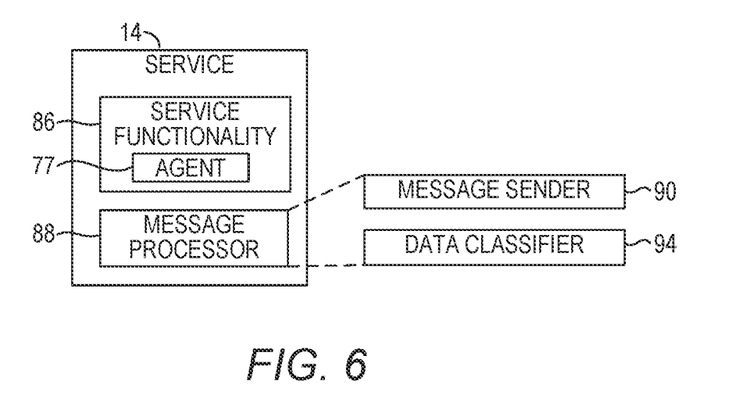
FIG. 6 is a block diagram of a service according to one implementation.

FIG. 6 is a block diagram of a service 14 according to one implementation. The service 14 implements a desired service functionality 86 associated with processing a transaction. The embodiments disclosed herein may be implemented in part via an agent 77 that is integral with the service functionality 86. The agent 77 operates to process any invocations by the service functionality 86 and any responses received by the service functionality 86. The agent 77 may then send any invocations and responses, along with the transaction ID associated with the invocation or response, to a message processor 88. The agent 77 may be developed in conjunction with the service functionality 86, or may be coupled to the service functionality 86 in a manner that is transparent to the service functionality 86 and does not require modification of the existing service functionality 86. As an example, in a JAVA environment, the agent 77 may be implemented via bytecode injection and in the case of Python by monkey patching or wrappers.

The message processor 88 receives information from the agent 77 related to the invocations of the service 14 and responses received by the service 14. The information may include all the data used in the invocation and in the case of a response, all the data received by the service 14.

The message processor 88 implements a data classifier 94 that analyzes the information received from the agent 77 to determine if the information contains sensitive data, and if so, identifies sensitive data sub-categorization types of such data. The data that is classified includes metadata associated with an invocation, such as data received in a RESTful API invocation, data sent by the service 14 to an information source, data received by the service 14 from an information source, and the like. The data classifier 94 may classify the data in any number of ways. The data classifier 94 may contain a list of data items, such as predetermined key words, which are associated with sensitive data, such as ""SSN", "DRIVERS LICENSE", "ADDRESS", and the like, and parse the data to determine if such keywords exist in the data. The data classifier 94 may utilize a plurality of different regular expressions (REGEXs) that identify search patterns for sensitive data items. For example, a data item having a format of xxx-xx-xxxx may be classified as a sensitive data sub-category type of SSN. The data classifier 94 may utilize a machine learned model that has been trained to identify and classify sensitive data items. The data classifier 94 may also remove from the information any data that is classified as sensitive data, and in its place identify the sensitive data sub-categorization types of such data. As an example, if a response includes an actual social security number (SSN), the data classifier 94 may remove the SSN from the information and replace it with an SSN_ID indicating that an SSN was in the information.

The message processor 88 implements a message sender 90 that operates to generate and send a transaction ID and the metadata associated with invocations and responses generated by the data classifier 94 to the collector service 14-N, as described above.

Figure 7:
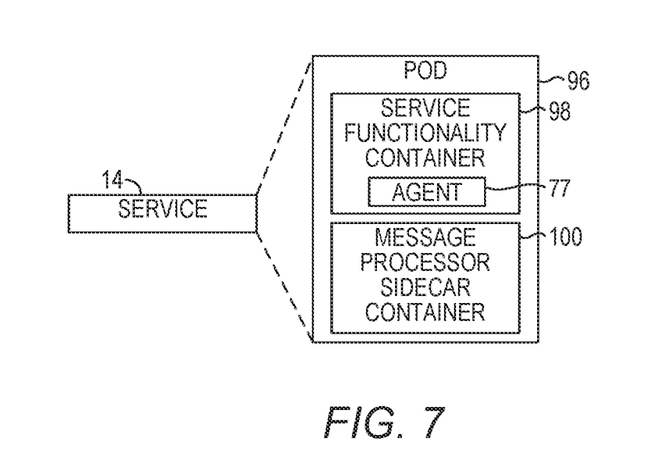
FIG. 7 is a block diagram of a service according to another implementation.

FIG. 7 illustrates a service 14 according to one embodiment. In this embodiment, the service 14 comprises a Kubernetes pod 96. The Kubernetes pod 96 includes a service functionality container 98 that implements the desired functionality of the service 14 and the agent 77. The Kubernetes pod 96 includes a message processor sidecar container 100 that implements the functionality of the message processor 88 illustrated in FIG. 6. In some embodiments, Kubernetes may automatically inject the message processor sidecar container 100 into any pod that has a particular predetermined label, such as "TRACESENSITIVEDATA", and thus the message processor sidecar container 100 can be implemented in a manner that is transparent to the service functionality container 98 and does not require modifications of the service functionality container 98.

In other embodiments, each service 14 may include the agent 77, but a centralized message processor service may implement the message processor 88. Each agent 77 sends the transaction ID and information associated with an invocation or a response to the centralized message processor service, which implements the data classification and sensitive data removal function discussed above, and then sends a message to the collector service 14-N.

Figure 8:
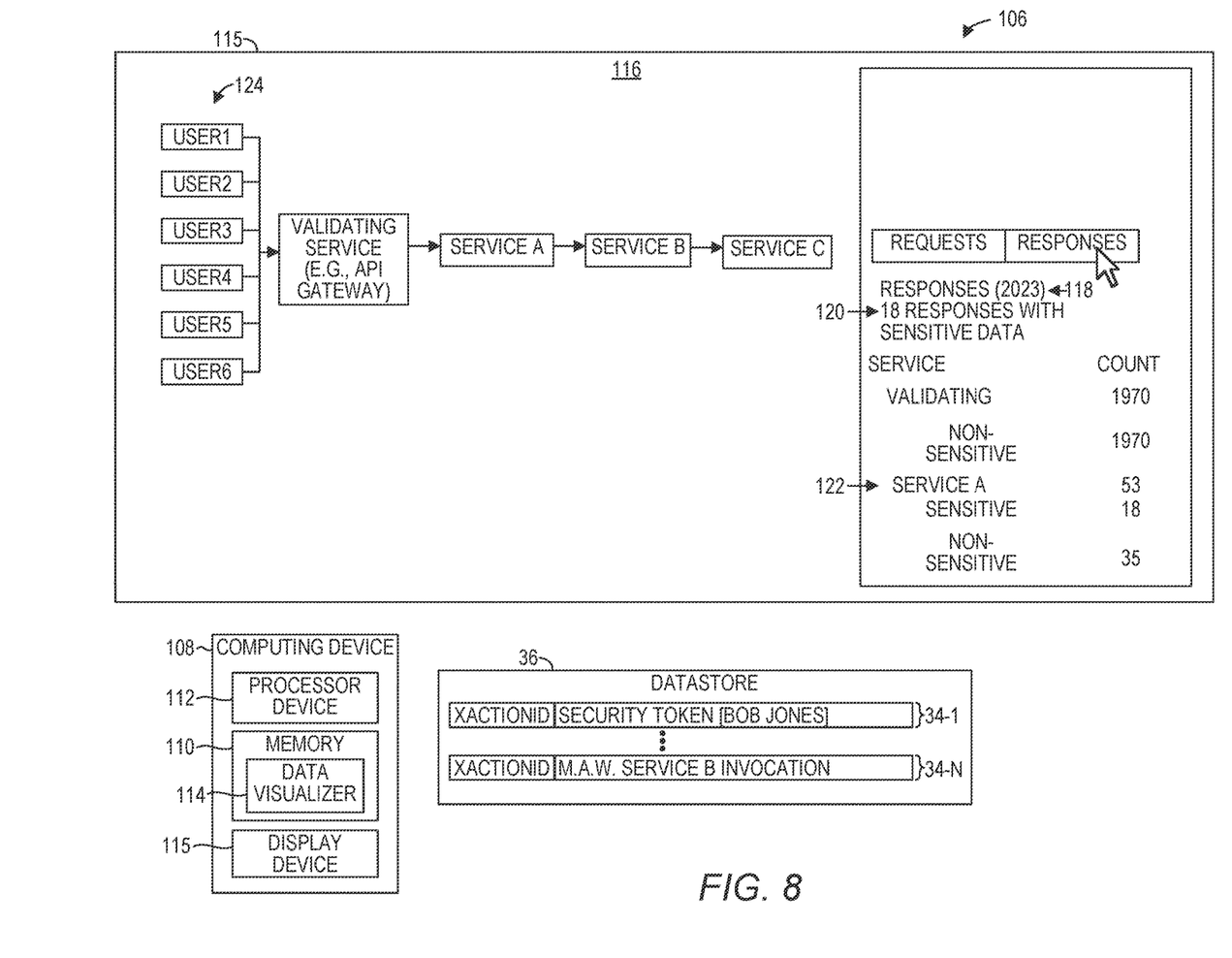
FIG. 8 is a block diagram of an environment for visualizing data according to one embodiment.

FIG. 8 is a block diagram of an environment 106 for visualizing data according to one embodiment. The environment 106 includes a computing device 108 that in turn includes a memory 110 and a processor device 112 coupled to the memory 110. A data visualizer 114 executes in the memory 110. The data visualizer 114 accesses the datastore 36 which comprises a plurality of records 34-1-34-N. There may be hundreds, thousands, or millions of records 34-1-34-N in the datastore 36.

Based on the records 34, the data visualizer 114 generates and presents, on a display device 115, user interface imagery 116 that depicts a count 118 of responses received by the plurality of services in response to invocations (2023), and a number 120 of such responses that included sensitive data (18). The user interface imagery 116 also indicates a service 122 that received the responses that included the sensitive data. The user interface imagery 116 also identifies the various entities 124 that are correlated to the transaction IDs in the records 34-1-34-N.

Figure 9:
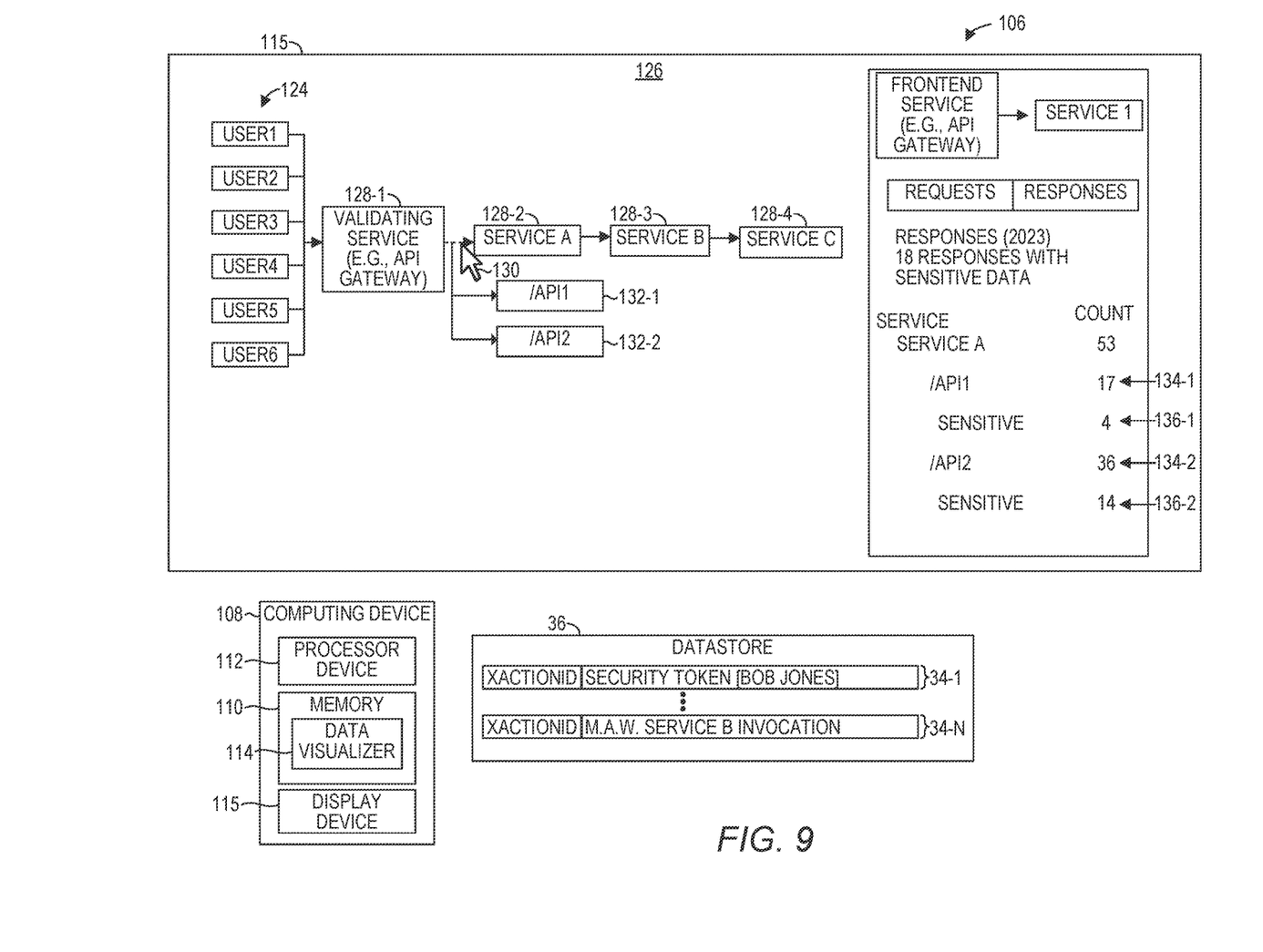
FIG. 9 is a block diagram of an environment for visualizing data according to another embodiment.

FIG. 9 is a block diagram of the environment 106 for visualizing data according to another embodiment. In this example, the data visualizer 114 accesses the plurality of records 34, and based on the records 34, presents, on the display device 115, user interface imagery 126 that depicts symbols 128-1-128-4 that correspond to the plurality of services 14. The data visualizer 114 receives a user input selection 130 that corresponds to a particular service, in this example, the service 14-2 that corresponds to the symbol 128-2. The data visualizer 114, based on the records 34, determines a plurality of functions of the service 14-2 that were invoked by an invoking service 14. The data visualizer 114 supplements the user interface imagery 126 on the display device 115 to identify a plurality of functions 132-1 and 132-2 of the service 14-2 that were invoked by an invoking service 14. In this example, two functions API1 and API2 were invoked by an invoking service 14. The data visualizer 114 supplements the user interface imagery 126 to include counts 134-1 and 134-2 of responses returned by the functions API1 and API2, and counts 136-1 and 136-2 of the number of such responses that included sensitive data.

Because the data visualizer 114 is a component of the computing device 108, functionality implemented by the data visualizer 114 may be attributed to the computing device 108 generally. Moreover, in examples where the data visualizer 114 comprises software instructions that program the processor device 112 to carry out functionality discussed herein, functionality implemented by the data visualizer 114 may be attributed herein to the processor device 112.

Figure 10:
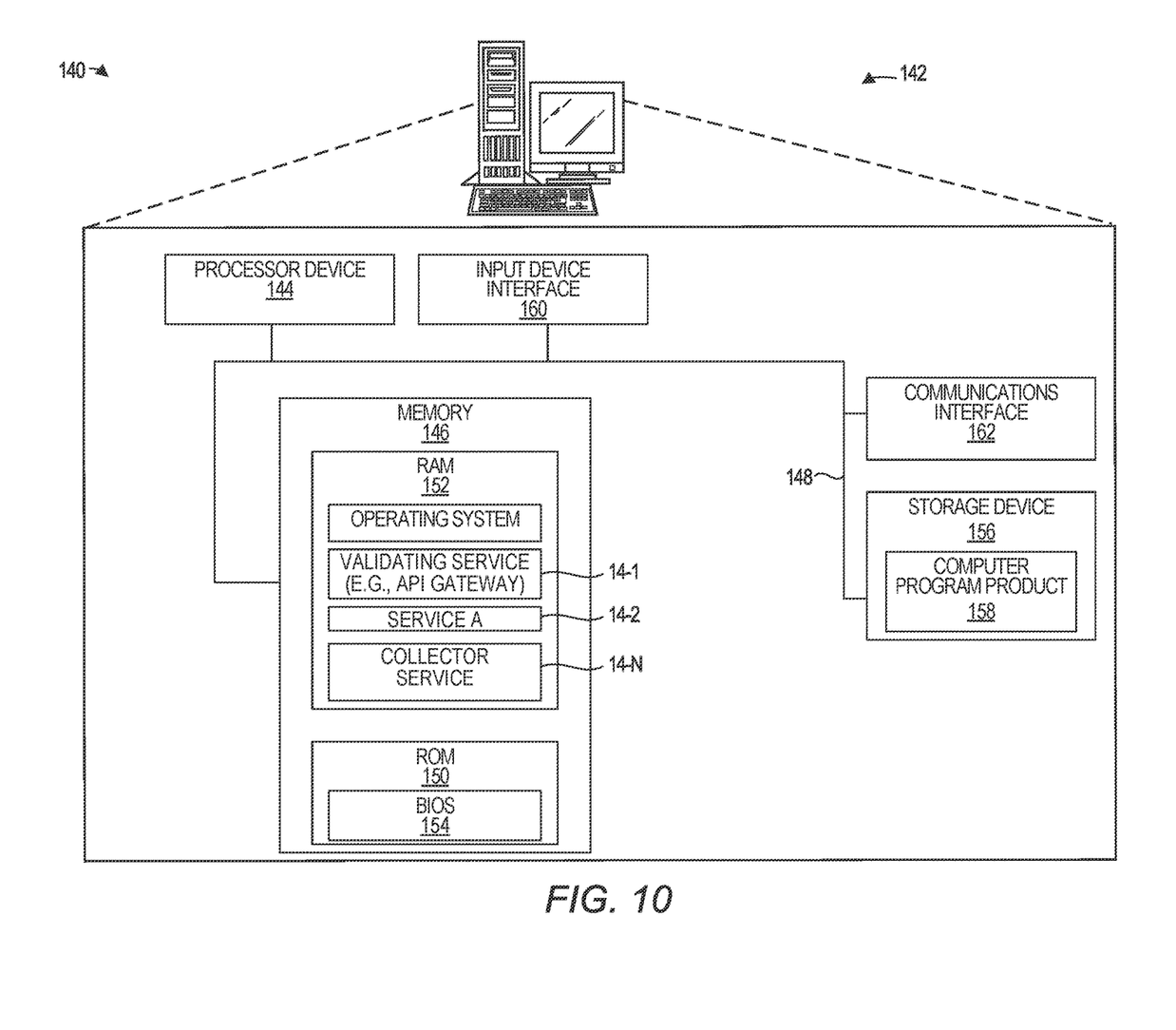
FIG. 10 is a block diagram of a system suitable for implementing the embodiments disclosed herein.

FIG. 10 is a block diagram of a computing system 140 suitable for implementing embodiments disclosed herein. The computing system 140 includes one more computing devices, each of which may be configured substantially similarly to a computing device 142. The computing device 142 includes one or more processor devices 144, a memory 146, and a system bus 148. The system bus 148 provides an interface for system components including, but not limited to, the memory 146 and the processor device 144. The processor devices 144 can be any commercially available or proprietary processor devices.

The system bus 148 may be any of several types of bus structures that may further interconnect to a memory bus (with or without a memory controller), a peripheral bus, and/or a local bus using any of a variety of commercially available bus architectures. The memory 146 may include non-volatile memory 150 (e.g., read-only memory (ROM), erasable programmable read-only memory (EPROM), electrically erasable programmable read-only memory (EEPROM), etc.), and volatile memory 152 (e.g., random-access memory (RAM)). A basic input/output system (BIOS) 154 may be stored in the non-volatile memory 150 and can include the basic routines that help to transfer information between elements within the computing device 142. The volatile memory 152 may also include a high-speed RAM, such as static RAM, for caching data.

The computing device 142 may further include or be coupled to a non-transitory computer-readable storage medium such as a storage device 156, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 156 and other drives associated with computer-readable media and computer-usable media may provide non-volatile storage of data, data structures, computer-executable instructions, and the like.

A number of modules can be stored in the storage device 156 and in the volatile memory 152, including an operating system and one or more program modules, such as one or more of the services 14, which may implement the functionality described herein in whole or in part. All or a portion of the examples may be implemented as a computer program product 158 stored on a transitory or non-transitory computer-usable or computer-readable storage medium, such as the storage device 156, which includes complex programming instructions, such as complex computer-readable program code, to cause the processor device 144 to carry out the steps described herein. Thus, the computer-readable program code can comprise software instructions for implementing the functionality of the examples described herein when executed on the processor device 144.

An operator may also be able to enter one or more configuration commands through a keyboard (not illustrated), a pointing device such as a mouse (not illustrated), or a touch-sensitive surface such as a display device. Such input devices may be connected to the processor device 144 through an input device interface 160 that is coupled to the system bus 148 but can be connected by other interfaces such as a parallel port, an Institute of Electrical and Electronic Engineers (IEEE) 1394 serial port, a Universal Serial Bus (USB) port, an IR interface, and the like. The computing device 142 may also include a communications interface 162 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a validating service of a plurality of services that compose an application that executes on one or more processor devices, a security token that identifies an entity that has submitted a transaction to the application, the security token indicating that the entity is authorized to submit the transaction to the application;
   obtaining, by the validating service, a transaction identifier that uniquely identifies the transaction;
   causing, by the validating service, the transaction identifier and data derived from the security token that identifies the entity to be sent to a collector service;
   receiving, by a downstream service, input data associated with the transaction, the input data including the transaction identifier;
   accessing, by the downstream service, an information source to obtain information; and
   causing, by the downstream service, the transaction identifier and metadata about the information to be sent to the collector service.

2. The method of claim 1 wherein the security token contains a digital signature of an identity provider, and further comprising validating, by the validating service, the digital signature of the identity provider prior to sending data derived from the security token to the collector service.

3. The method of claim 1 wherein the security token identifies an individual who submitted the transaction to the application.

4. The method of claim 1 wherein causing, by the validating service, the data derived from the security token that identifies the entity to be sent to the collector service further comprises causing, by the validating service, a name of an individual who submitted the transaction to be sent to the collector service.

5. The method of claim 1 wherein obtaining, by the validating service, the transaction identifier that uniquely identifies the transaction comprises generating, by the validating service, the transaction identifier.

6. The method of claim 1 further comprising:
   invoking, by the validating service, the downstream service; and
   providing, by the validating service to the downstream service, the transaction identifier.

7. The method of claim 6 wherein invoking, by the validating service, the downstream service comprises sending, by the validating service to the downstream service, a hypertext transfer protocol (HTTP) GET request; and
wherein providing, by the validating service to the downstream service, the transaction identifier comprises inserting, in the HTTP GET request, the transaction identifier.

8. The method of claim 1 wherein the plurality of services uses a RESTful Application Programming Interface (API) to communicate with each other.

9. The method of claim 1 wherein the information source comprises one of a datastore, a second downstream service of the plurality of services, and a file.

10. The method of claim 1 wherein the metadata comprises a sensitive data classifier that indicates the information contains data that has been classified as sensitive data.

11. The method of claim 1 wherein the metadata comprises a sensitive data sub-categorization that identifies a particular sensitive data sub-categorization type from a plurality of different sensitive data sub-categorization types.

12. The method of claim 1 wherein the metadata identifies an API endpoint of the information source that was accessed by the downstream service.

13. The method of claim 1 wherein the information comprises a datastore, and the metadata about the information includes a datastore identifier and a table identifier of a datastore table from which the information was obtained.

14. The method of claim 1 wherein the information comprises a plurality of data items, and further comprising:
processing at least one data item of the plurality of data items;
based on processing the at least one data item, determining that the at least one data item comprises sensitive information; and
determining a particular sensitive data sub-categorization type of the at least one data item; and
wherein the metadata identifies the particular sensitive data sub-categorization type.

15. The method of claim 14 wherein processing the at least one data item of the plurality of data items comprises analyzing the at least one data item with one or more regular expressions.

16. The method of claim 14 wherein processing the at least one data item of the plurality of data items comprises inputting the at least one data item into a machine learned model that has been trained to classify sensitive data items.

17. The method of claim 1 further comprising:
receiving, by the collector service, the transaction identifier and the data derived from the security token that identifies the entity;
storing, by the collector service in a datastore, the transaction identifier and an entity identifier such that the transaction identifier is correlated to the entity;
receiving, by the collector service, the transaction identifier and the metadata about the information; and
storing, by the collector service in the datastore, a record that includes at least a portion of the metadata and the transaction identifier.

18. The method of claim 17 further comprising:
accessing, by the one or more processor devices, the datastore, wherein the datastore comprises a plurality of records;
based on the plurality of records, generating user interface (UI) imagery that depicts a count of responses received by the plurality of services in response to invocations, and a number of such responses that included sensitive data; and
presenting the UI imagery on a display device.

19. The method of claim 17 further comprising:
accessing, by the one or more processor devices, the datastore, wherein the datastore comprises a plurality of records;
based on the plurality of records, presenting, on a display device, UI imagery that depicts symbols that correspond to the plurality of services;
receiving, by the one or more processor devices, a user input selection that corresponds to a particular service;
based on the record, determining a plurality of functions of the particular service that were invoked by an invoking service; and
supplementing the UI imagery on the display device to identify the plurality of functions of the particular service that were invoked by the invoking service.

20. A computing system comprising:
one or more processor devices of one or more computing devices, wherein the one or more processor devices are configured to:
receive, by a validating service of a plurality of services that compose an application, a security token that identifies an entity that has submitted a transaction to the application, the security token indicating that the entity is authorized to submit the transaction to the application;
obtain, by the validating service, a transaction identifier that uniquely identifies the transaction;
cause, by the validating service, the transaction identifier and data derived from the security token that identifies the entity to be sent to a collector service;
receive, by a downstream service, input data associated with the transaction, the input data including the transaction identifier;
access, by the downstream service, an information source to obtain information; and
cause, by the downstream service, the transaction identifier and metadata about the information to be sent to the collector service.

21. A non-transitory computer-readable storage medium that includes executable instructions configured to cause one or more processor devices to:
receive, by a validating service of a plurality of services that compose an application, a security token that identifies an entity that has submitted a transaction to the application, the security token indicating that the entity is authorized to submit the transaction to the application;
obtain, by the validating service, a transaction identifier that uniquely identifies the transaction;
cause, by the validating service, the transaction identifier and data derived from the security token that identifies the entity to be sent to a collector service;
receive, by a downstream service, input data associated with the transaction, the input data including the transaction identifier;
access, by the downstream service, an information source to obtain information; and
cause, by the downstream service, the transaction identifier and metadata about the information to be sent to the collector service.

* * * * *